United States Patent [19]

Komaru et al.

[11] 3,921,135

[45] Nov. 18, 1975

[54] APPARATUS AND METHOD FOR MEMORIZING DOT PATTERNS IN A MEMORY SYSTEM

[75] Inventors: Takeshi Komaru, Tokyo; Toshio Shimamura, Yokohama, both of Japan

[73] Assignee: Fujitsu Limited, Kawasaki, Japan

[22] Filed: Apr. 17, 1973

[21] Appl. No.: 351,971

[30] Foreign Application Priority Data

Apr. 18, 1972 Japan .............................. 47-038925

[52] U.S. Cl. .................. 340/146.3 MA; 178/DIG. 3; 340/324 M

[51] Int. Cl.² .......................................... G06K 15/00

[58] Field of Search .......... 340/146.3 MA, 146.3 H, 340/146.3 R, 324 R, 324 M, 324 AD, 146.3 AQ, 324 A; 178/DIG. 3

[56] References Cited

UNITED STATES PATENTS

| | | | |
|---|---|---|---|
| 3,643,016 | 2/1972 | Dattilo | 178/DIG. 3 |
| 3,686,631 | 8/1972 | Elliott | 178/DIG. 3 |
| 3,730,988 | 5/1973 | Shimizu | 178/DIG. 3 |
| 3,829,831 | 8/1974 | Yamamoto et al. | 340/146.3 AQ |

*Primary Examiner*—Leo H. Boudreau
*Attorney, Agent, or Firm*—Staas & Halsey

[57] ABSTRACT

This invention relates to apparatus and method for memorizing dot patterns in a memory system, and particulary to a method for memorizing a dot pattern of a character or numeral in a memory system comprising the steps of, first dividing a character or numeral into large meshes for obtaining a first data train composed of "on" and "off" dots, thereafter dividing each of only the on dots obtained by the first dividing into smaller meshes for obtaining a second data train composed of on and off dots, and storing the first and second data trains in a memory system.

8 Claims, 16 Drawing Figures

APPARATUS AND METHOD FOR MEMORIZING DOT PATTERNS IN A MEMORY SYSTEM

BACKGROUND OF THE INVENTION

1. Field of the Invention

This invention relates to apparatus and methods for memorizing dot patterns in a memory system.

2. Description of the Prior Art

It has been recently proposed to adopt a method in which a printing type is composed of many dots arranged in a matrix form to be stored in a memory and a character desired to be printed is selectively read out from the memory, displayed on a Braun tube and photographed for plate making purpose. In this case, the number of the dots is required to be large for enhancement of the quality of a printed character and, to meet this requirement, it has been proposed to use as many dots as 64×64 or 128×128. However, an increase in the number of dots causes an increase in the number of memory elements and it is necessary to prepare, for example, about 10,000 characters for printing, so that the memory capacity of the memory inevitably becomes enormous and the memory improperly occupies the majority of the space and cost of plate making facilities of this kind.

SUMMARY OF THE INVENTION

Accordingly, a primary object of this invention is to provide apparatus and method for memorizing dot patterns in a memory system so that it is possible to decrease the capacity of the memory without lowering the quality of a character, numeral or like pattern.

In accordance with this and other objects of the invention, there is provided a method and apparatus for reducing the number of storage elements required to memorize an image such as an alphanumeric character, which comprises the steps of dividing the image into relatively large areas, determining whether a portion of the character to be stored is disposed in each such area, and providing a first sequence, or train, of signals indicative of the presence of the character within each such area. Further, each such large area having therein a portion of the character to be stored is further divided into smaller areas, and a second train, or sequence, of signals is generated indicating whether the character falls within the smaller areas of the larger area. The first and second trains of signals then are stored in a suitable memory.

In a further embodiment of this invention, a selection process is carried out to determine which of the signals corresponding to the smaller areas represent either a change from an on to an off, or from an off to an on state, where an on signal represents a small area having an image portion therein and an "off" signal indicates a small area with no image portion therein. On the signals representing such transitions are stored, with a consequent reduction in the size of the required memory.

Other objects, features and advantages of this invention will become apparent from the following description taken in conjunction with the accompanying drawings.

DESCRIPTION OF THE PREFERRED EMBODIMENTS

In accordance with the method of memorizing dot patterns of this invention, a character or numeral pattern is divided into large meshes or area portions to obtain a first data train composed of on dots and off dots. The meshes containing on dots are further divided into smaller meshes or area portions to obtain a second data train composed of on dots and off dots and then the first and second data trains thus obtained are stored. This invention will hereinafter be described, by way of example, with reference to the drawings.

Figure 1:
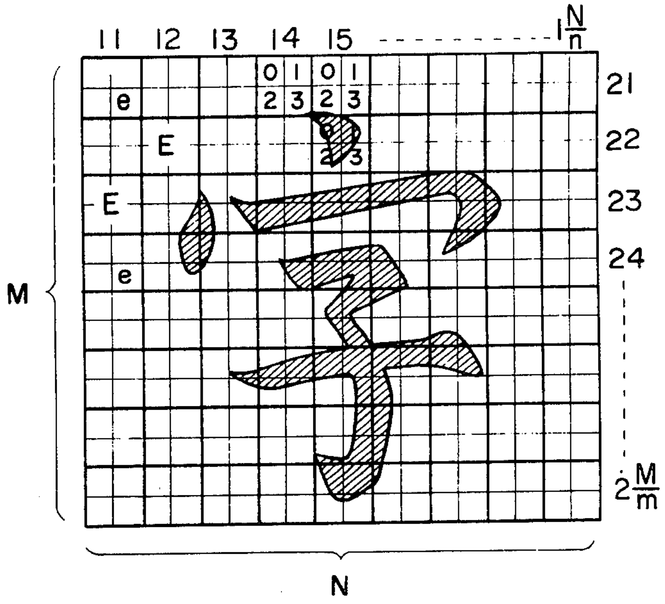
FIG. 1 is a diagram, for explaining the method of this invention.

FIG. 1 shows the surface of a printing type of a Chinese Character. In the case of storing this character in a memory, it is divided into (N×M)'s area portions, each of which is examined as to whether it contains a portion of by the character or not. Those area portions which are covered or crossed by the character, even if slightly, are classified as on and those which are not covered or crossed are classified as off. The data indicating on and off portions thus obtained are stored in the memory. With this method, however, if the area portions are made small and if their on and off states are all stored in the memory so as to provide for enhanced accuracy, the capacity of the memory inevitably becomes enormous as described previously. To avoid this, in the present invention, the character is divided into large area portions at first for examining their on or off state and then the on area portions are further divided into smaller area portions for examining their on or off state. Namely, in FIG. 1, the larger meshes area portions as indicated by the letter E, are those which are surrounded by heavy lines and each contain four smaller. Of these larger area portions E, those, e.g., (14, 21), (15, 22), . . . (the area portions being represented in co-ordinates) which are covered or crossed by the character are on, and the other larger area portions not covered or crossed by the character are off. The on or off state of the smaller area portions $e$ contained in the on larger meshes E is examined. In the illustrated example, the smaller area portions 0, 1 and 2 of the larger portions (14, 21) are "off" 0, and only the small area portion 3 is "on" or 1. In the mesh (15, 21), its smaller portions 0 and 1 are off or 0, and those portions 2 and 3 are on or 1. In the large portion (15, 22), its smaller portions 0 to 3 are all on or 1. The on and off states of all the larger portions E and those of the smaller portions $e$ of the larger portions in the on state are stored in the memory. This eliminates the necessity of storing detailed information on the larger area portions E in the off state, and hence decreases the number of the memory elements correspondingly. Further, it will become apparent from the following description that the capacity of the memory can be decreased without lowering the quality of the character.

In FIG. 1, the meshes are square and the larger area portions E each contain four smaller portions $e$; but this invention is not limited specifically thereto. Generally, in the case of representing a character with a pattern using (N×M)'s dots, the character is divided into $(N/n)\times(M/m)$'s larger dots ($n$ and $m$ are integers larger than 2 and in the case of $N/n$ and $M/m$ being not integers, they are made integral by adding integers smaller than $n$ and $m$ to the numerators respectively). Then, only those larger dots or area portions which are in the on state (assuming that there are $k$ such dots or area portions) are further divided into $(n\times m)$'s smaller dots or area portions for examining their on or off state and $(N\times M/n \times m + K(n\times m))$'s dots are stored. It is also possible to store the dots thus modified in the following form further modifying them:

$$\frac{N}{n_1 \times n_2 \ldots n_x} \times \frac{M}{m_1 \times m_2 \ldots m_x} + \sum_{i=1}^{x} k_i(n_i \times m_i)$$

Further, in the case where the on dots are small in number, it is also possible to achieve the abovedescribed treatment in connection with the off dots and reverse the results at the time of providing the dot output.

Figure 2A:
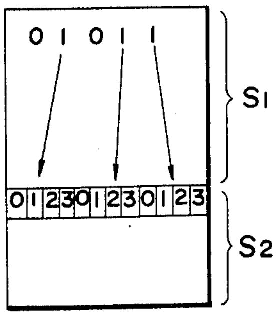
FIGS. 2A to 2C, inclusive, are diagrams, for explaining this method of memory on a memorizing dot patterns surface.
Figure 2B:
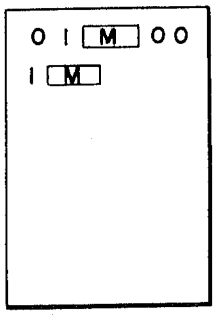
Figure 2C:
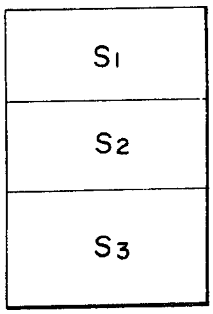
Figure 8:
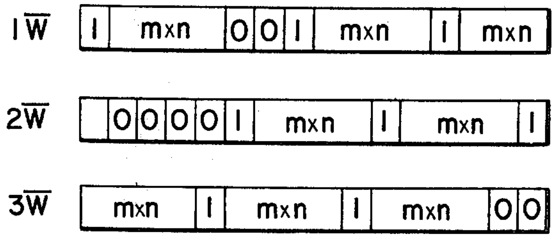
FIG. 8 illustrates one example of the memory data format.

In the storing of the data obtained as described above and depicted in FIG. 2A, the on-off information 0, 1, . . . of the dots for the larger area portions E is stored in an area $S_1$ on the memory surface and the on-off information of the dots for the smaller area portions 0 to 3 of the larger area portions E of the on dots is stored in a modifier area $S_2$. Alternatively, it is also possible to use the same memory surface for the on-off information of the dots of the larger area portions E and that of the dots of the smaller area portions $e$, in which case when the dots of the larger area portions E become on, the modifier of the dots of the smaller area portions of the on larger area portions, that is, their on-off information M is recorded, as shown in FIG. 2B. FIG. 8 shows the format of the memory data according to the system of FIG. 2B. FIG. 2C shows an ordinary case, in which the dot data $$\frac{N}{n_1 \times n_2 \ldots n_x} \times \frac{M}{m_1 \times m_2 \ldots m_x},$$

the modifier for the on dots on the area $S_1$, that for the on dots on the area $S_2$, that modifier data of the previous modifier data, are stored on the areas $S_1$, $S_2$ and $S_3$ respectively.

A concrete example of this invention will be described. Where one character is divided into (64×64) area portions, 64×64=4096 memory elements are required for storing the on-off information of all the dots. With the system of this invention described previously with regard to FIG. 1, however, the number of memory elements required is $$\frac{64}{2} \times \frac{64}{2} + k \times 4,$$

$k$ being the number of the larger area portions E which are on. Accordingly, if $k \leq 256$, the number of the memory elements required is reduced to less than half.

Figure 3:
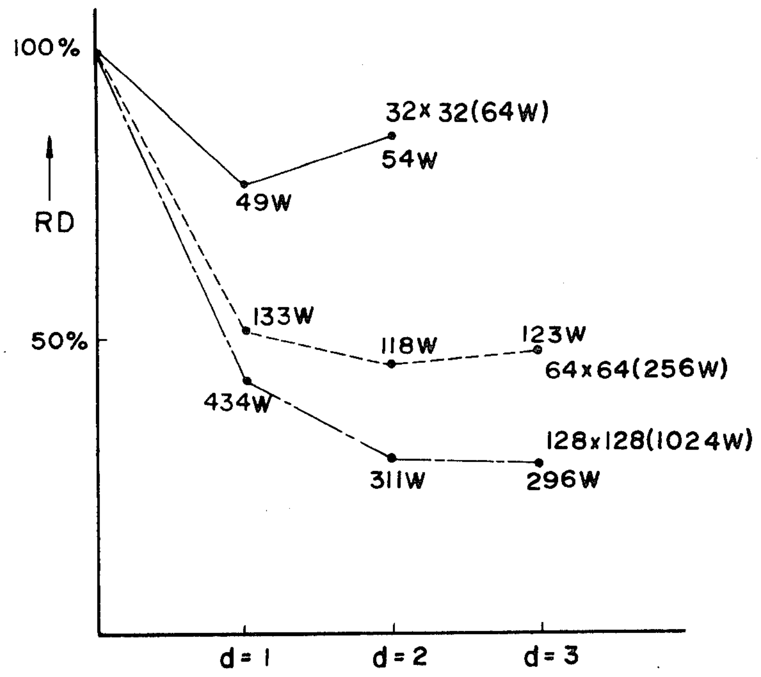
FIG. 3 is a graph showing the degree of a decrease in the number of memory elements used.
Figure 4:
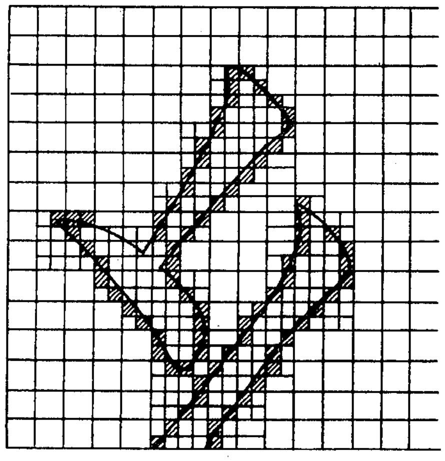
FIG. 4 is a diagram, for explaining another memory system employed in this invention.

For further modification of the modified data, the depth $d$ of modification is considered. The depth $d$=1 indicates, for example, the smallest area portions 0, 1, 2, . . . in FIG. 1 and $d$=2 indicates the square area portions E each containing four smallest area portions and surrounded by heavy lines. As the modifier depth increases, the number of dots, that is, the number of memory elements decreases but does not decrease without any restriction and when the depth exceeds a certain value, the number of the memory elements increases reversely. FIG. 3 shows the rates of decrease RD (measured value) where the modifier depth $d$ is altered to 1, 2 and 3 in connection with a Chinese Character different from that shown in FIG. 1.

Where the on dots are large in number, especially where they are continuous to adjacent ones in the scanning direction, it is uneconomical to store all of modifiers for the on dots. To avoid this, in this invention, only those dots which change from on to off or vice versa in the scanning direction as depicted in FIG. 4 are stored and the dots between them are held on by means of a circuit. This method enables omission of storing the on data on the inside of the character, and hence assures further decrease in the capacity of the memory. However, this method is considered on the assumption that the dot or area portion, which changes from off to on, is always followed by that which changes from on to off, that is, these dots make a pair. Therefore, if one dot appears as in the form of an independent point, some consideration is needed for the system of holding the dot in the on state by the circuit. Then, in such a case, the dot which changes from off to on should be followed by the dot in the on state if these dots are continuous to each other, but the dot following the on dot is off, and accordingly this is contradictory to the premise, from which the dot in question is discriminated as independent. It is preferred to indicate the independent point with a modifier bit.

Phototype process using the printing type information stored according to the system described in the foregoing is achieved in the following manner.

Namely, in general, a character to be plated, in other words, a character to be displayed on a cathode ray tube is designated by an output from a computer or a keyboard and is displayed by a signal having selected bits coded corresponding to the character to be displayed. Accordingly, when the signal arrives at the memory, the memory position in the memory corresponding to the signal designating the character is usually designated through a decoder and the contents stored at that memory position are sequentially read out. Such operation is achieved by known techniques concerning memories and the method therefor need not be described in this specification and does not belong to the subject matter of this invention.

In the case where the memory system of, for example, FIG. 2B is employed, that is, the information is stored in the manner shown in FIG. 8, the signal read out from the memory (not shown) is composed of 16-bit parallel signals.

Figure 5:
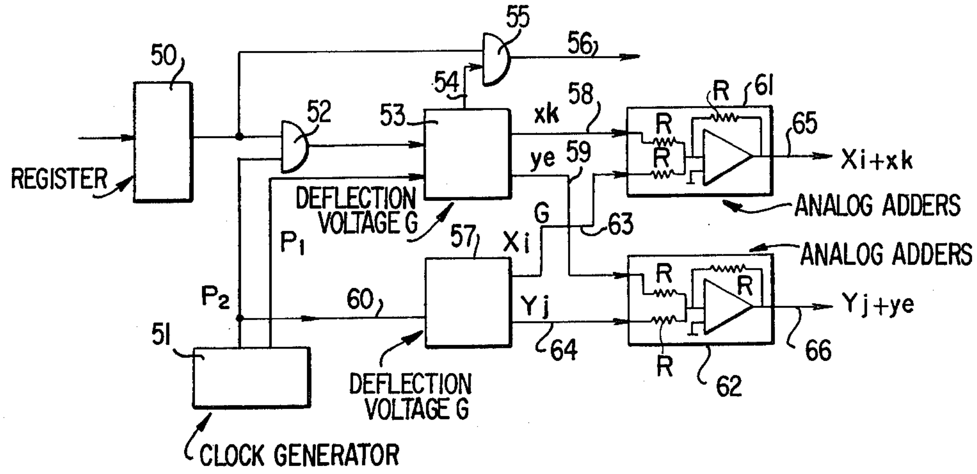
FIG. 5 is a circuit diagram showing a Braun tube deflection and a blanking control circuit employing memory data.
Figure 6A:
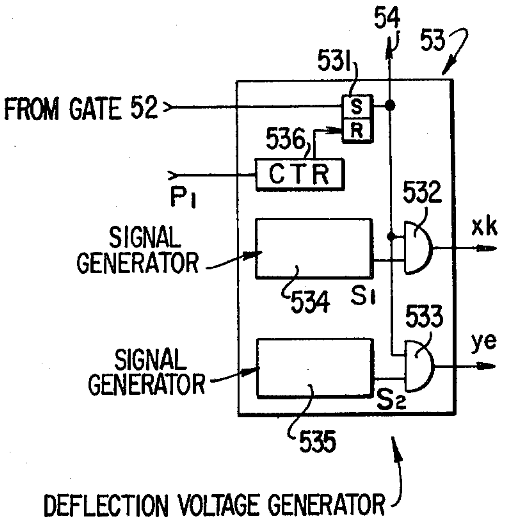
FIG. 6A is a block diagram showing in detail a deflection voltage generator used in the circuit of FIG. 5.

The 16-bit parallel signals read out from the memory are applied to a register 50 in FIG. 5. In FIG. 5, reference numeral 51 indicates a clock generator which provides a clock signal $P_1$ having a period T′, shown in FIG. 6B, and a clock signal $P_2$ having a period T(T>T′), shown in FIG. 7B. Accordingly, the signals stored in the register 50 are sequentially read out through an AND gate 52 with the period T. Where the output from the AND gate 52 is 1, the output signal 1 is fed to a deflection voltage generator 53 thereof as to set a flip-flop 531 depicted in FIG. 6A. Consequently, AND gates 532 and 533 are opened to provide signals $S_1$ and $S_2$ generated from signal generators 534 and 535. At the same time, an output appears in a line 54 to open an AND gate 55. The deflection voltage generator 53 is provided with a self-return counter 536 as shown in FIG. 6A and it is driven by the clock signal $P_1$ step by step and it resets the flip-flop 531 with a value having counted the clock pulse $P_1$ during the period T as depicted in FIG. 6B and, at the same time, it operates by itself to return the counted value to zero.

Figure 6B:
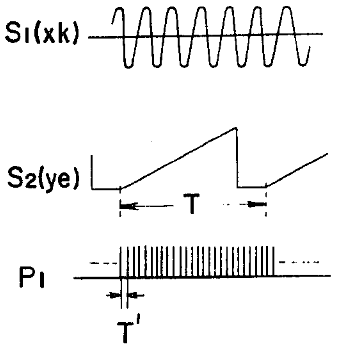
FIG. 6B shows waveforms appearing at respective points of the circuit of FIG. 6A.

On the other hand, the outputs from the signal generators 534 and 535 have such waveforms as indicated by $S_1$ and $S_2$ in FIG. 6B respectively. Accordingly, when the AND gates 532 and 533 are opened, such outputs appear in lines 58 and 59 respectively, the outputs being indicated by Xk and Ye.

Figure 7A:
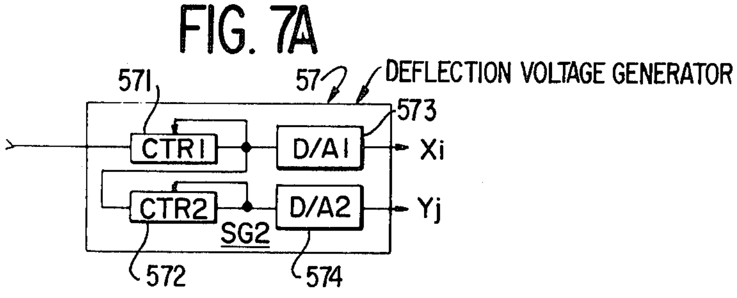
FIG. 7A is a block diagram illustrating in detail another deflection voltage generator employed in the circuit of FIG. 5.
Figure 7B:
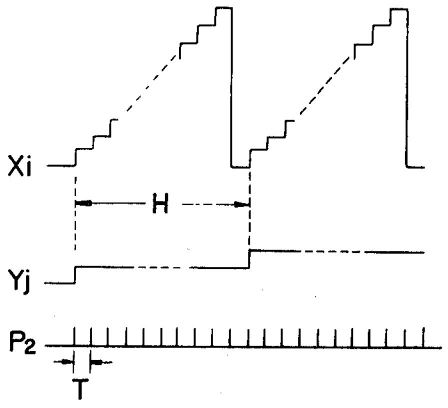
FIG. 7B shows waveforms appearing at respective points of the circuit of FIG. 7A.

As illustrated in FIG. 7A, a deflection voltage generator 57 is provided with a self-return counter 571 which is connected with a line 60 and driven by the clock signal $P_2$ step by step and another self-return counter 572 which is driven by the output from the counter 571. Digital-to-analog converters 573 and 574 produce voltages Xi and Yj corresponding to the count values of the counters 571 and 572 respectively. Their waveforms are depicted in FIG. 7B. The counter 571 is driven step by step by the clock signal $P_2$ having the period T, shown in FIG. 7B.

In FIG. 5, reference numerals 61 and 62 designate analog adders, which add together the voltages Xk(FIG. 6B) and Xi(FIG. 7B) fed thereto through lines 58 and 63 respectively and apply a voltage Xi+Xk to a line 65. While, the analog adder 62 adds together the voltages Ye(FIG. 6B) and Yj(FIG. 7B) fed thereto through lines 59 and 64 and applies a voltage Yj+Ye to a line 66. When the output from the AND gate 52 becomes 1, the larger area portion E is 1 and the information is applied to the smaller area portion *e* through an AND gate 55 and a line 56. This information is impressed to the grid of a cathode ray tube (not shown) to carry out brightness modulation. At the same time, the respective deflection voltages are impressed to X- and Y-axis deflection circuits of the cathode ray tube through the lines 65 and 66.

Figure 9:
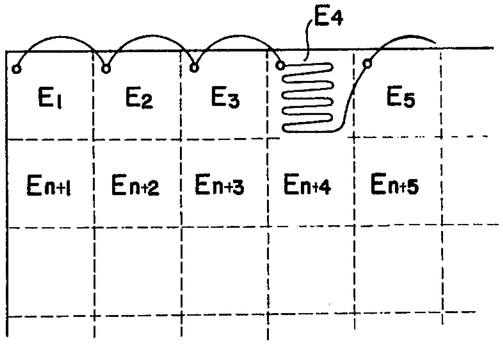
FIG. 9 is a diagram for explaining a scanning method employed in this invention.

At this time, an electron beam moves on the phosphor screen of the cathode ray tube as shown in FIG. 9. In this case, the larger area portions E except a region $E_4$ are 0, so that no scanning on their smaller area portions *e* is achieved. This is based on the fact that, referring to FIGS. 5 to 7, while the output from the AND gate 52 is 0, the flip-flop 531(FIG. 6A) is in its reset condition, and signals $S_1$ and $S_2$ are not conducted through AND gates 532, 533, respectively.

The character thus displayed on the cathode ray tube is photographed for plate making.

Figure 10:
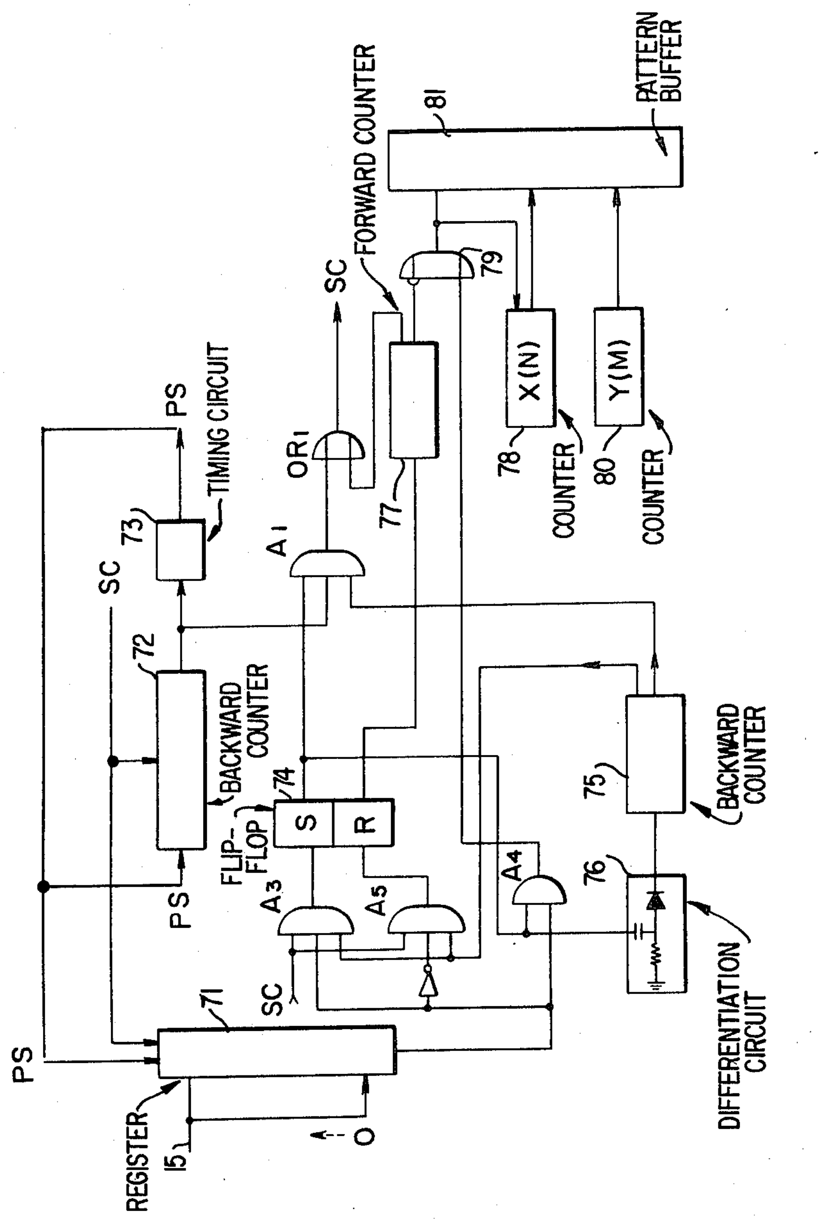
FIG. 10 shows a pattern reproducing circuit employed in this invention.

FIG. 10 illustrates in block form a circuit for reproducing a pattern stored in a compressed form. In a register 71 similar to register 50 shown in FIG. 5, there is stored by a set clock pulse PS the 16-bit parallel signal read out from the memory. At the same time, a count value 16 is set by the set clock pulse PS in a 16-bit subtractive register (Backward Counter) 72. The set clock pulse PS is derived from a timing circuit 73 and the timing circuit 73 is formed with an inverter which provides 1 when the output logic state from the subtractive register 72 is 0. The signal stored in the register 71 is shifted out for each bit by a shift clock pulse SC derived from an OR gate OR1 and, at the same time, the count value of the subtractive counter 72 is subtracted i.e., reduced, correspondingly by one. The output from the register 71 is applied to a flip-flop 74 through AND gates A3 and A5. In the presence of the output from the AND gate A3, the flip-flop 74 is set at 1 and its output is fed to an AND gate A1, thereby indicating that the bit for the larger area portion E is 1 and thus that at least one of the bits for the smaller area portion *e* is 1. The circuit of FIG. 10 will hereinbelow be described on the assumption that each larger area portion E contains (m×n)'s smaller area portions *e*.

Reference numeral 75 identifies a backward counter of (m×n)'s bits, in which a count value m×n is set by a trigger signal derived through a differentiation circuit 76 when the flip-flop 74 is set. When the count value is set, it is immediately subtracted one by one and a logic 1 is applied to an AND gate A1 (m×n) times until the count value is reduced to zero. Accordingly, the shift clock pulse derived from the OR gate OR1 successively appears (m×n) times, by which series signals of (m×n) bits following the logic 1 of the register 71 are sequentially applied to a pattern buffer circuit 81 through an AND gate A4. When the counter 75 returns to zero, the flip-flop 74 is reset through an AND gate A5.

At the same time, the reset output for the flip-flop 74 serves as a trigger of an n×m bit additive counter 77. The additive counter (forward counter) 77 is of the type which is advanced by the trigger step by step and reset to zero at the time of its step value being m×n. The counter 77 provides the shift clock pulse SC through the OR gate OR1 when it is reset. The output derived from the counter 77 is inhibited and applied to an OR gate 79. Accordingly, the flip-flop 74 is reset and then it is held in its reset condition by the logic output 1 obtained through the AND gate A3 and, at this time, the logic 0 of m×n bits is fed to a pattern buffer 81.

In FIG. 10, counters 78 and 80 are counters for counting a maximum of N bits and M bits, respectively, and their count values are supplied to the pattern buffer 81. Namely, the counter 78 counts the number of logic outputs 1 or 0 derived from the OR gate 79 and returns to zero when it has counted to N. At this time, the counter 78 drives the counter 80 by one step. The counter 80 returns to zero after having counted to M maximum.

The pattern buffer 81 is a pattern memory for one character having (N×M)'s bits arranged in a matrix form and the logics 1 and 0 fed through the OR gate 79 are sequentially stored at co-ordinate positions obtained through decoders (not shown) in accordance with the count values of the counters 78 and 80. The relationship of the memory with the decoders is well known as a write-in operation in the memory and is not related to the subject matter of this invention and hence no description will be given. In the manner described above, the original pattern is reproduced.

In the case of transferring the pattern information from the pattern buffer 81 to another unit, it can be transferred in a continuous form by means of serial shift. In the case of applying it to a bus, a serially read out information can be transferred in parallel after arranged in the unit of 8 or 16 bits.

Another example of this invention will be described.

Figure 11:
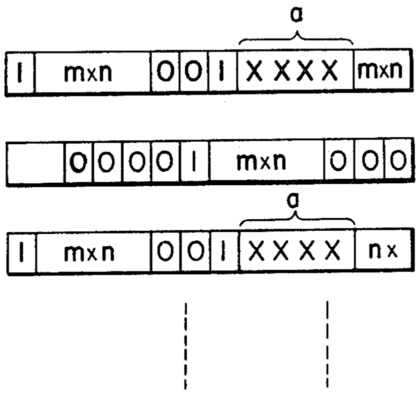
FIG. 11 illustrates the data format of a pattern compression method according to the example of FIG. 4.
Figure 12:
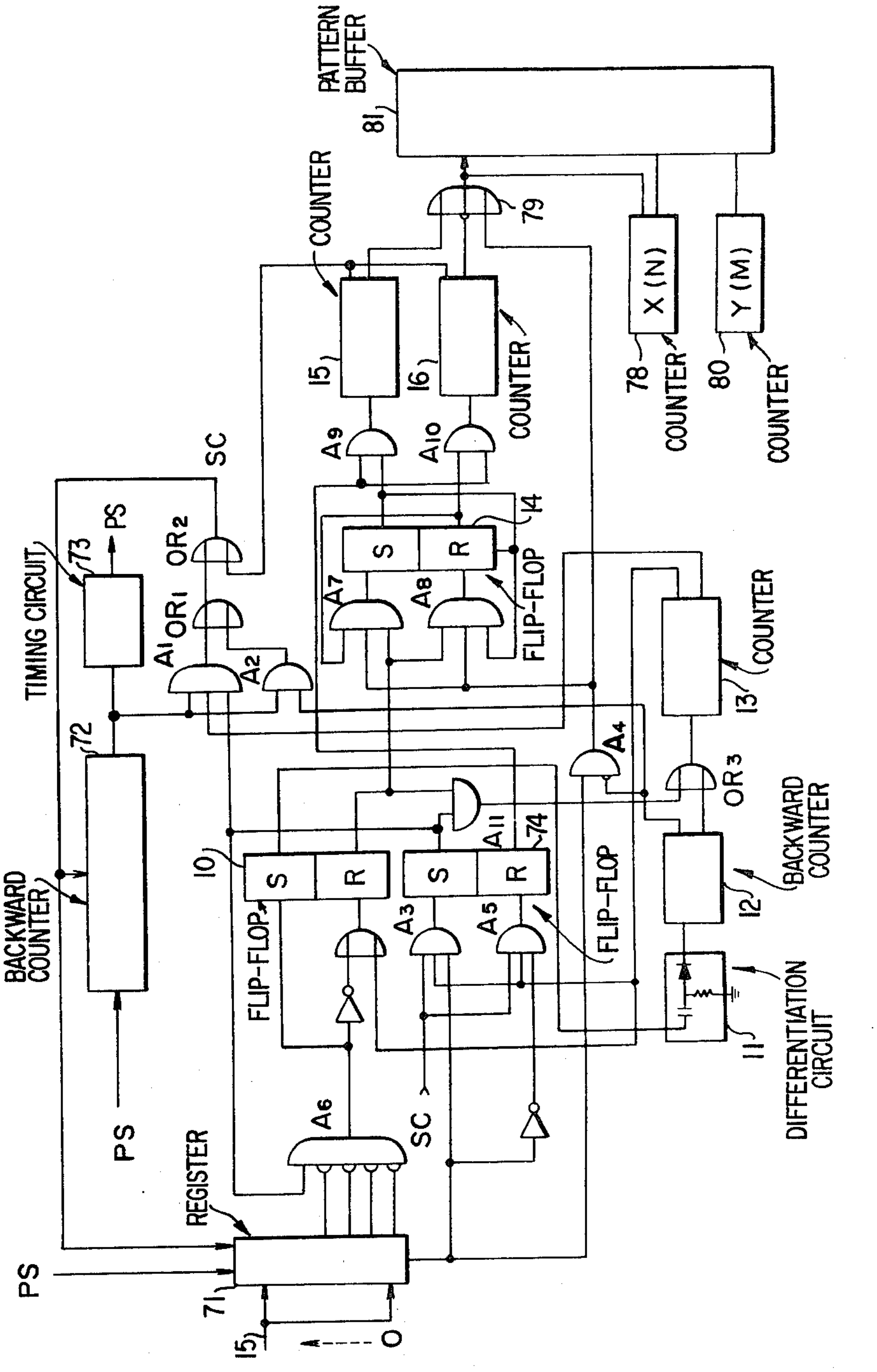
FIG. 12 shows one example of a compressed pattern reproducing circuit for use in this invention.

FIG. 11 shows the data format of the pattern compression method according to FIG. 4. Crosses xxxx indicated by *a* in the compression data (refer to FIG. 11) indicate the bit in which an independent point is contained in the (n×m)'s dot data. Namely, the present data format is different from that of FIG. 8 in this point. A compressed pattern reproducing circuit according to this method is depicted in FIG. 12. In FIG. 12, parts corresponding to those in FIG. 10 are marked with the same reference numerals. In the figure, a compressed pattern is supplied from a memory (not shown) in the unit of a 16-bit parallel signal to a 16-bit register 71 and stored therein. This reproducing method is the same as that employed in the example of FIG. 10 and it is different from the system of FIG. 4 in that when a bit designating the larger area portion E is 1, there is the possibility of an independent point being contained in the next information and that also in the case of the bit designating the larger area portion E being 0, there is the possibility that the independent point is not stored as information in the memory but contained in practice.

Accordingly, the reproducing circuit illustrated in FIG. 12 is different from the foregoing example in the provision of a circuit, which detects the independent point and a point of change of the information and reproduces dots even if the bit indicating the larger area portion E is 0, and a circuit which discriminates the point of change of the information by the detection of the independent point. The 16-bit parallel signal read out from the memory is stored by the set clock pulse SC in the register 71 and shifted out for one bit by the shift clock pulse SC and, at the same time, the initial count value of 16 of the backward counter 72 is subtracted for each bit. The output from the register 71 is applied to the flip-flop 74 through the AND gates A3 and A5. When an output is derived from the AND gate A3, the flip-flop 74 is set at 1 and the output is fed to the AND gates A1 and A6. The AND gate A6 is a gate for detecting whether the leading four bits in the register 71 are all 0 or not, that is, whether the dot is an independent point or not. Accordingly, if the dot is an independent point, the flip-flop 10 is set and its output serves to trigger a four-value Backward counter 12 through the differentiation circuit 11. When the counter 12 is triggered, four values are set therein and sequentially subtracted one by one and fed to an inhibit input of the AND gate A4 to close it. Therefore, the four bits representing the independent point (the number of the bits need not be limited specifically to four and accordingly the same is true of the detecting bits of the AND gate A6) are prevented from being applied to the pattern buffer 81. When the counted value becomes zero, a counter 13 is trigger by an OR gate OR3. When the counter 13 is triggered, a value m×n is stored therein and it is sequentially subtracted one by one and the output from the counter 13 is fed to the AND gate A1 to permit the passage therethrough of (m×n)'s shift clock pulses to energize the register 71 and the backward counter 72 through the OR gates OR1 and OR2, and (m×n)'s on and off bits for the smaller area portions *e* of the independent point are supplied to the pattern buffer 81 through the gates A4 and 79.

Next, assume that the flip-flop 74 is set, that no output is derived from the AND gate A6 and that the flip-flop 10 is in its reset condition. At this time, the leading four bits indicate the point of change and are applied to an AND gate A7 and through the AND gate A4 at the timing of setting the flip-flop 74 and, at the same time, an AND output of gate A7 of the reset conditions of the flip-flops 10 and 14 is obtained to put the flip-flop 14 in its set condition, thus indicating the point of change. An AND'ed output of the reset condition of the flip-flop 10 and the set condition of the flip-flop 74 is derived through an AND gate A11 to energize the counter 13. In the counter 13, the value m×n is set and subtracted one by one and (m×n)'s shift clock pulses are applied to the register 71 and the counter 72 through the AND gate A1 and the OR gates OR1 and OR2. The pattern buffer 81 stores on-off bit pattern of the smaller area portions *e* on which the point of change lies. At the instant when the counter 13 returns to zero after subtraction, the flip-flop 74 is reset.

Where the dot of the larger area portion E is off and the flip-flop 74 is not set, the following two states exist. Namely, the one is the case where the smaller area portions *e* of the larger mesh E are all off dots and the other is the case where the independent point lies in the area between points of change and all the dots are on.

In the former case, the reset output of the flip-flop 74 is led to AND gates A9 and A10 but since the flip-flop 14 indicating the point of change is held in its reset condition, only the AND gate A10 is opened to energize a counter 16. When energized, the counter 16 counts to m×n and is then reset, during which the input is inhibited, so that (m×n)'s 0 are applied to the pattern buffer 81 through an OR gate 79. At the instant when the counter 16 is reset after counting the clock pulses to m×n, the shift clock pulse SC is applied to the register 71 and the counter 72 through the OR gate OR2 to start the operation for the next large area portion E.

In the latter case between two points of change, the AND gate A9 is opened to energize the counter 15. The operation of the counter 15 is the same as that of the counter 16 but since the input to the OR gate 79 is not inhibited, the counter 15, when energized, applies (m×n)'s 1 to the OR gate 79. At the same time, the counter 15 performs counting up to m×n to supply (m×n)'s 1 to the pattern buffer 81, and, when reset, sends out the shift clock pulse SC through the OR gate OR2.

After the input to the pattern buffer 81 for the larger area portion E lying between the points of change has been thus applied, the next point of change appears but, at this time, the flip-flop 14, held in its set condition, is reversed to its reset condition and then (m×n)'s on and off dots for the smaller area portion *e* are applied to the pattern buffer 81.

The on - off pattern thus applied to the pattern buffer 81 is reproduced to the format of the original non-compressed pattern by the same operations as those described previously with regard to FIG. 7.

As has been described in the foregoing, the present invention enables a great reduction of the capacity of the memory without lowering the quality of the pattern.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. Apparatus for decompressing data representative of an image divided into ($M/m \times N/n$) relatively large area portions, each large area portion assuming a first or second state dependent respectively upon the presence or absence of the image therein, each of said relatively large area portions of a first state being divided into ($m \times n$) smaller portions, each of the smaller portions assuming one of said first and second states, dependent respectively upon the presence or absence of the image therein, said apparatus comprising:

means for providing a sequence of signals indicative of the first and second states of the relatively large portions and first and second states of the relatively smaller portions of each large portion of the first state;

bistable means responsive to those signals representative of the large portions of the first state to provide a first output and to the large portions of the second state to provide a second output;

storage means for receiving and storing in a defined, expanded manner signals indicative of whether each of the ($M \times N$) small portions is in the first or second state;

first counter means responsive to the first output of said bistable means for facilitating the application of ($m \times n$) signals from said providing means indicative of the first and second states of the smaller portions of a larger portion indicated by said bistable means to be of a first state, to said storage means; and second counter means responsive to the second output of said bistable means for applying ($m \times n$) signals indicative of the second state to said storage means, whereby signals indicative of the state of each of the ($M \times N$) smaller portions is stored in said storage means.

2. Apparatus as claimed in claim 1, wherein said providing means provides a sequence of signals in an order corresponding to that in which the compressed signals are derived from the image; and there is further provided address means associated with said storage means for applying the signals as derived from said providing means and said second counter means to said storage means so that these signals are stored in said storage means in a defined, decompressed manner.

3. Apparatus as claimed in claim 1, wherein said providing means provides a sequence of signals indicative of the image arranged in a plurality of $M/m$ lines, each having $N/n$ large area portions; and there is further provided address means including third counting means for counting an N number of the signals corresponding to the storage of signals of a line of the small area portions into a line portion of said storage means, and fourth counter means responsive to a count of said third counter means equal to N for storing the next line of signals for the small area portions into the next line portion of said storage means.

4. Apparatus for decompressing compressed coded data representing an image within a field made up of $$\left(\frac{M}{m} \times \frac{N}{n}\right)$$

relatively large area portions, each of said relatively large area portions capable of being subdivided into ($m \times n$) small area portions, where ($M \times N$) represents the number of such potential small area portions, the coded data comprising a plurality of signal groups corresponding to each of the large area portions, said signal groups comprised of a first signal indicative of the presence or absence of the image within one large area portion, said signal group including second signals indicative of the presence or absence of the image within each of the subdivided, smaller area portions of the one large area portion only if the first signal of the signal group indicates the presence of the image within the one large area portion, said apparatus comprising:

coded signal generating means for providing a train of the signal groups;

image memory means for storing discrete signals indicative of each of the small area portions of the compressed coded data in an uncompressed form;

first memory means responsive to a signal group indicative of a large area portion that transitions from the absence to the presence of the image therein, to be disposed to its first state, and responsive to a signal group indicative of another large area portion that transitions from the presence to the absence of the image therein to be disposed to its second state;

first generating means responsive to the first state of said first memory means for generating ($m \times n$) second signals indicative of the presence of the image portion, for each large area portion occurring until said first memory means is disposed to its second state;

second memory means responsive to a signal group having a first signal indicative of the presence of the image within its large area portion to be disposed to its first state wherein the second signals of said signal group are applied to said image memory means and responsive to another signal group having a first signal indicative of the absence of the image within its large area portion to be disposed to its second state; and second signal means responsive to the second state of said second memory means for facilitating the application of ($m \times n$) second signals indicative of the absence of the image to said image memory means.

5. Apparatus as claimed in claim 4, wherein selected signal groups include a manifestation that its large area is an independent point in the image, and there further is included third memory means responsive to the presence of the manifestation to be disposed from its second state indicative of the absence of the manifestation to its first state, and gate means responsive to the first state of said third memory means for preventing the application of the manifestation to said image memory means.

6. The apparatus as claimed in claim 5, wherein there is included a first counter actuated by the disposal of said third memory means to its first state to initiate a count to a given number of signals comprising the manifestation, and a second counter responsive to a count of said first counter equal to the given number to initiate the generation of a $(m \times n)$ number of signals whereby the second signals of the independent signal group are applied to said image memory means.

7. Apparatus as claimed in claim 6, wherein said second counter upon reaching its predetermined count applies a signal to said third memory means to dispose said third memory means to its second state in preparation for processing the next signal group.

8. Apparatus as claimed in claim 7, wherein said third memory means in its second state applies a signal to said first memory means to dispose said first memory means in its second state.

* * * * *

UNITED STATES PATENT AND TRADEMARK OFFICE

CERTIFICATE OF CORRECTION

PATENT NO. : 3,921,135

DATED : November 18, 1975

INVENTOR(S) : Takeshi Komaru and Toshio Shimamura

It is certified that error appears in the above-identified patent and that said Letters Patent are hereby corrected as shown below:

Column 1, line 57, change "On" to --Only--.
Column 2, lines 2-3, change "ing this method of memory on a memorizing dot patterns surface;" to --ing this method of memorizing dot patterns on a memory surface;--.
Column 2, lines 9-10, change "memory" to --stored--.
Column 2, line 65, after "smaller" and before the period (.), insert --area portions e--.
Column 3, line 2, change "are off. The on or off" to --are "off". The "on" or "off"--.
Column 3, line 5, after "off" insert --,or--.

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*